United States Patent
Weldemariam et al.

(10) Patent No.: US 11,376,470 B2
(45) Date of Patent: Jul. 5, 2022

(54) CHATBOT EXERCISE MACHINE

(71) Applicant: International Business Machines Corporation, Armonk, NY (US)

(72) Inventors: Komminist Weldemariam, Nairobi (KE); Jonathan Lenchner, Yorktown Heights, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 934 days.

(21) Appl. No.: 16/160,052

(22) Filed: Oct. 15, 2018

(65) Prior Publication Data

US 2020/0114207 A1    Apr. 16, 2020

(51) Int. Cl.
| | | |
|---|---|---|
| *A63B 71/00* | (2006.01) | |
| *A63B 24/00* | (2006.01) | |
| *H04L 51/02* | (2022.01) | |
| *G06N 3/00* | (2006.01) | |
| *G06N 20/00* | (2019.01) | |
| *H04L 67/50* | (2022.01) | |
| *H04L 67/306* | (2022.01) | |

(52) U.S. Cl.
CPC ...... *A63B 24/0087* (2013.01); *A63B 24/0062* (2013.01); *A63B 24/0075* (2013.01); *G06N 3/006* (2013.01); *G06N 20/00* (2019.01); *H04L 51/02* (2013.01); *H04L 67/22* (2013.01); *H04L 67/306* (2013.01); *A63B 24/0084* (2013.01); *A63B 2024/0065* (2013.01); *A63B 2024/0068* (2013.01); *A63B 2024/0081* (2013.01); *A63B 2024/0096* (2013.01)

(58) Field of Classification Search
CPC ........ H04L 67/306; H04L 67/22; H04L 51/02
USPC .......................................................... 482/9
See application file for complete search history.

(56) References Cited

U.S. PATENT DOCUMENTS

| | | | |
|---|---|---|---|
| 7,455,622 B2 * | 11/2008 | Watterson | H04L 12/6418 482/8 |
| 10,413,238 B1 * | 9/2019 | Cooper | A61B 5/1118 |
| 11,282,604 B2 * | 3/2022 | Mason | A63B 21/00178 |

(Continued)

FOREIGN PATENT DOCUMENTS

WO    WO-2015108700 A1 *  7/2015    ......... G06K 9/00342

OTHER PUBLICATIONS

Mel, et al. "The NIST Definition of Cloud Computing". Recommendations of the National Institute of Standards and Technology, Nov. 16, 2015.

*Primary Examiner* — Hee Soo Kim
(74) *Attorney, Agent, or Firm* — Barak Cohen, Esq.; McGinn I.P. Law Group, PLLC

(57) ABSTRACT

An exercise chatbot control method through augmented reality, system, and computer program product for controlling an exercise machine including a chatbot include determining a context of a user on the exercise machine via a sensor, learning an effectiveness of an activity for the user using the exercise machine, dynamically configuring the activity for the user on the exercise machine and a level of performance of the activity to an ideal activity level based on a user profile, the context of the user, and the effectiveness of the activity for the user, and providing an output including the ideal activity level from the chatbot to the user.

20 Claims, 5 Drawing Sheets

(56) References Cited

U.S. PATENT DOCUMENTS

| | | | |
|---|---|---|---|
| 2008/0300914 A1* | 12/2008 | Karkanias | A63B 71/0622 |
| | | | 705/2 |
| 2010/0273610 A1* | 10/2010 | Johnson | A61B 5/11 |
| | | | 482/9 |
| 2018/0278691 A1* | 9/2018 | Vergara, Jr. | G16H 40/67 |
| 2020/0054922 A1* | 2/2020 | Azaria | A63B 24/0087 |

* cited by examiner

CHATBOT EXERCISE MACHINE

BACKGROUND

The present invention relates generally to an exercise chatbot control method, and more particularly, but not by way of limitation, to a system, method, and computer program product for dynamically configuring different physical activities and levels based on the user profile information and/or current user state.

An exercise machine is any machine used for physical exercise. These machines range from simple spring-like devices to computerized electromechanical rides to recirculating-stream swimming pools, Most exercise machines incorporates an ergometer. An ergometer is an apparatus for measuring the work a person exerts while exercising as used in training or cardiac stress tests or other medical tests.

Conventional exercise machines track various user activity such as heart rate, caloric burn, distance traveled, etc. Other conventional exercise machines provide a follow-along training session via a video player.

However, the conventional exercise machines do not dynamically adapt to a user's exercise needs to provide varied workouts that continuously motivate a user.

SUMMARY

The invention can provide an improvement to the conventional exercise machines by integrating a chatbot with an exercise machine to determine the user state (including a cognitive state such as autism, drowsiness, anxiousness, anxiety, etc.) using various sensors accelerometers, biometrics, biofeedback, alpha-wave detection, etc., to learn the appropriate activities for the given user and can also be inferred from a fitness level database, such that the chatbot can dynamically configure different physical activities and levels based on the user profile information and/or current user state.

In an exemplary embodiment, the present invention provides a computer-implemented exercise chatbot control method for controlling an exercise machine including a chatbot, the method including determining a context of a user on the exercise machine via a sensor, learning an effectiveness of an activity for the user using the exercise machine, dynamically configuring the activity for the user on the exercise machine and a level of performance of the activity to an ideal activity level based on a user profile, the context of the user, and the effectiveness of the activity for the user, and providing an output including the ideal activity level from the chatbot to the user. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
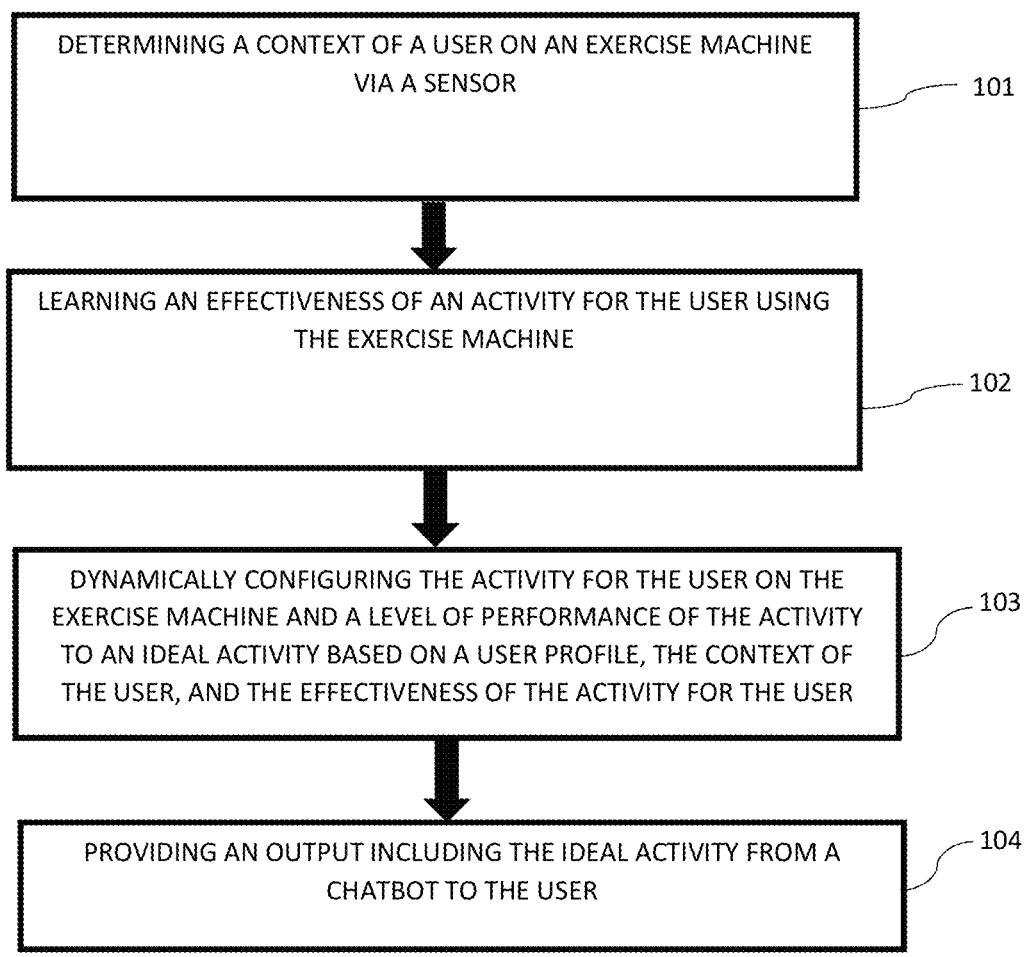
FIG. 1 exemplarily shows a high-level flow chart for an exercise chatbot control method 100 according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of an exercise chatbot control method 100 according to the present invention can include various steps for providing an output (e.g., motivational dialog, etc.) via an exercise machine.

Figure 3:
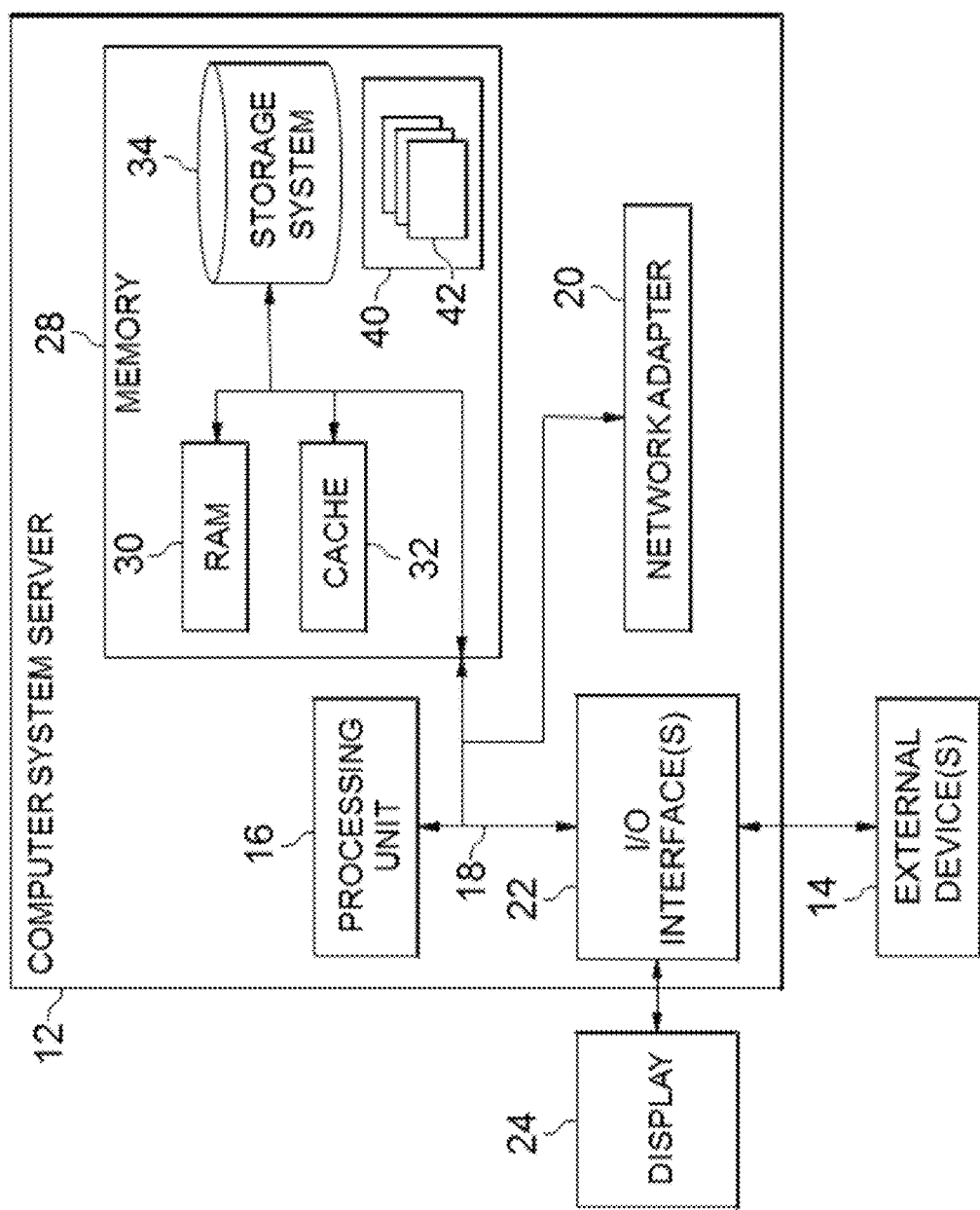
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

With the use of these various computing components, the method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Although one or more embodiments may be implemented in a cloud environment 50 (e.g., FIG. 5), it is nonetheless understood that the present invention can be implemented outside of the cloud environment.

It is noted that the method 100 interacts with an exercise machine that includes a chatbot (e.g., a computer program or an artificial intelligence agent that is programmed to conduct a conversation via auditory and/or textual methods and that is controlled by a processor). The exercise machine may be any of a treadmill, exercise hike, weight-training machine, rowing machine, skiing machine, climbing machine, elliptical machine, etc.

Referring to FIG. 1, in step 101 a context (e.g., a state) of a user on the exercise machine is determined via a sensor. And, in step 102, an effectiveness of an activity for the user is learned while the user is using the exercise machine.

Figure 2:
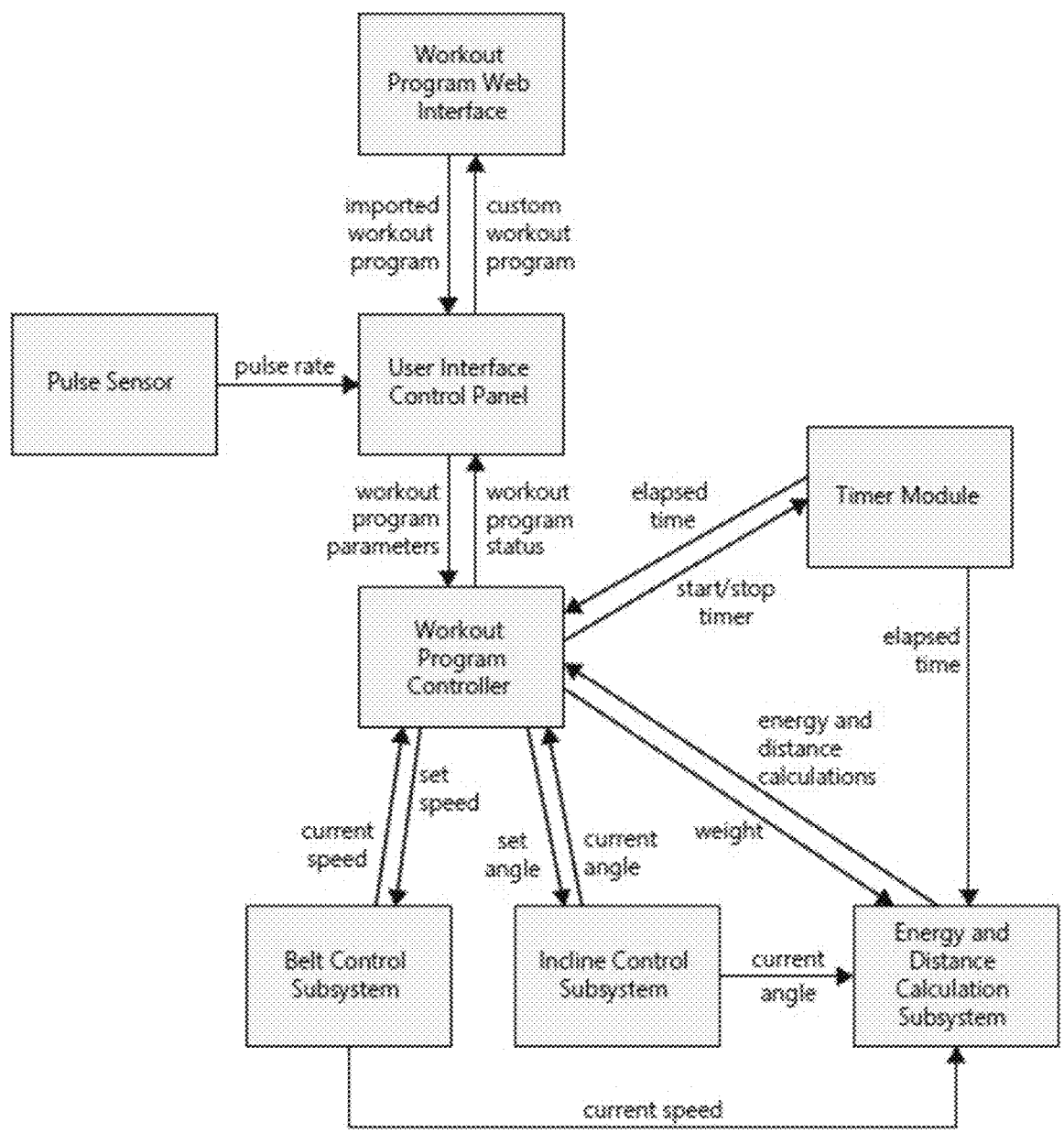
FIG. 2 exemplarily depicts a sensor network for providing exercise information to the chatbot according to an embodiment of the present invention.

For example, FIG. 2 depicts a sensor network to detect the state of the user when they are exercising on the exercise machine. That is, various treadmill sensors may provide information to the chatbot system. For example, a pulse sensor (i.e., often part of treadmills when holding the rails) may be used for the chatbot system for knowing when to "take it easy" on the motivation, or to be more motivational (e.g., more "intense" encouragement). Similar considerations exist for the incline control system.

The context may include ambient context such as time of day, day of week, how the user's nearby friends in the gym are performing, location of the machine, etc. The context may include a variety of user contexts such as a user profile (e.g., user-specified exercise goals, user conditions, does user like competition or exercise in his/her own "zone"), a user cohort, a user history (e.g., history of user exercise types with associated durations spent {T}, a user's calendar for the day or week, a history of use of one or machines for the day, a user state (e.g., relative physical inactivity), history of trainer feedback, etc.

A user state may be detected or estimated and may include a cognitive state of the user (e.g., autism, drowsiness, anxiousness, anxiety, etc.). The detection of the user state may involve sensors such as accelerometers, biometrics, biofeedback, alpha-wave detection, etc. If desired, the user exercise or activity levels associated with specific exercise and personalities is computed, or estimated, from the sensed data using machine-learning algorithms.

It is noted that inbuilt sensors (of the exercise machine) may be used to measure the activity of the user. Generally, the activity level detection function may further take in to consideration existing activity monitoring methods and systems as input. The difficulty level, encouraged by the chatbot, for physical activity or type of physical activity may be adjusted based on how successfully the user completed the physical activities in the past. This feedback loop may allow the chatbot system to learn the appropriate activities for the given user (e.g., step 102). The information of the fitness level of the user is available in a user profile database.

Different physical activities are selected based on the user profile information, such as age of the user, and his physical capability (which can for example be influenced by his health condition, like recent surgery) so that selected exercise level is appropriate for this user and for rehabilitative therapy. This invention may be useful to partially control or assist with obesity.

The activity involves any of standing up, taking steps, jumping, gesturing at a screen, relaxing of the eyes, taking breaths for relaxation in an anxious child, rowing, climbing, the speed of motions, etc. The method of the chatbot system may automatically correlate a detected user state with physical exhaustion and personal exercise goals (e.g., fitness, personality-type, etc.), which can be specified by the user.

To detect the context and learn the effectiveness, the exercise machine may be augmented to contain a camera and other sensors to recognize if the user is tired or particular "spunky" looking (e.g., highly motivated or perked-up), visibly distracted and so on. It may also estimate if person could be at a greater risk of falling due to gait, distraction level, facial expression, etc.

It is noted that an appropriate context-specific difficulty level of an exercise can be computed through machine learning and signal processing methods that analyze the device signal signatures while the user is exercising. And, the model for the learning can be customized with trainers that can provide direct user feedback for level of difficulty or activity monitoring. Thus, the system can develop a personalized interaction and content based recommender that associates user exercise and machine personality.

In step 103, the activity for the user on the exercise machine and a level of performance of the activity is dynamically configured to an ideal activity level (e.g., optimal exercise) based on a user profile, the context of the user, and the effectiveness of the activity for the user and the ideal activity level is output to the user via a chatbot.

For example, the exercise machine's outputs and inputs may be via earphones and/or microphone. The chatbot system may automatically select or recommend music (or reading material, or audio books, or chatbot-generated jokes) that can go with the user context (e.g., personality associated with the exercise types, cultural norms, etc.). Such selection of music may be determined by analyzing various interactions and outputs from a crowd of exercise machines. If desired, the chatbot system may facilitate or initiate a conversation between two nearby users via their earphones. The method of triggering a conversation is determined based on similarity or personality analysis between the users, exercise goals similarities, pattern similarities, music choices, etc. By conversing with each other two users on the same type of machine, (i.e. both on a treadmill) can decide to have a virtual race with one another and the system (e.g., chatbot) can coordinate such a race.

With reference generally to the invention, the invention is, at least in part, directed to systems and methods for providing exercise devices with motivational programming via a humanlike chatbot. The chatbot chatter can be "synchronized" with the motivational content for controlling operation of the exercise device. The chatbot style and content (e.g., content spoken by the chatbot, musical content, etc.) may include instructional and educational content for the benefit of the user, and conveyed in a friendly and/or compelling personalized manner. In some sense, the invention is providing exercise machines with a personality. Therefore, the invention can provide a virtual exercise companion to a user.

The output can be further optimized via machine learning (i.e., the chatbot system may learn from historical data comprising interaction and engagement of the user with one or more exercise machines). For example, the invention may also identify a set of monitored activities. A set of preferences and goals for the exercise sequence can also be identified, e.g., by a user chatting. A set of accumulated information regarding any user modifications to previous exercise sequences may be optionally identified. A set of scheduled events can even be identified. Access to a user's calendar may help enable the invention. Through its integration with one or more calendaring applications, the system can help coordinate group exercise sessions, and provide verbal alerts and notifications within these systems.

In one embodiment, races with other entities can be the output of the chatbot. For example, the exercise sessions may even be coordinated for users not in the same physical space (i.e., one user may be exercising on a treadmill in their home, a second on a treadmill in the gym and a third on a treadmill at the office gym) with virtual races conducted across these environments. A virtual coach may be barking out information to each virtual competitor regarding where they stand in the race, whether to go harder, and so on. While some of this functionality could be provided through video display, the invention does not require a video display. The chatbot organizes a virtual race as the output, either with a purely artificial opponent or with other exercisers on the same machine type (i.e., all on treadmills), or even on different machine types. The opponent can even be the same user but on an earlier day. If the opponent is virtual, it need not be a human but may take other forms, such as creatures, cyborgs, machines, King Kong, Godzilla, etc. It may take the form of famous people in history, including world leaders, sports heroes, despots, etc. It may take the form of famous animals in history (e.g., race horses). The "form" may refer to avatar appearance, chatbot speech accents and slang, etc. The chatbot may be used to emulate, at least partially, such people or entities (like jockeys on a horse, who a user may race in a fanciful fashion).

In one embodiment, a personality module may further manage their user's workout formats towards desired results by matching user's goals while keeping the user mentally stimulated by personalizing content. If access granted, then the chatbot may create (and update) elements on the user electronic calendar based on the user initial exercise goals.

The chatbot may be programmed to chatter about unrelated (but interesting or fun) items for a user. For example, if the user is interested in jokes, sports, etc., the chatbot can chatter about these topics, with humor, derision, etc.

In one embodiment, the chatbot may take into consideration performance by individuals in virtual or actual groups, and its chatbot style can change because of this consideration. Various input information to our chatbot may include lengths and exertion levels of exercise periods and establishment of heart rate (pulse) zones. In some embodiment, the chatbot may recommend a personal trainer (or be a personal trainer) or provide recommendations to take group exercise classes based on a personality type of the user.

In one embodiment, the exercise machine may be sent and receive information over the Internet, with appropriate provisions for security and privacy including data encryption and/or anonymization as useful. Thus, the chatbot demeanor and wording may optionally encourage interactive participation. In one scenario, the chatbot exercise system can learn what demeanor is most effective over time, as the machine develops a personality such as a personality associated with its vocal output and conversational style). For example, if one user responds to a chatbot that is demanding, brusque, and authoritarian (e.g., as judged from his or her monitored exercise progress), then the system may adapt this personality in the future with the user. On the other hand, another user may respond to a chatbot personality that is more caring and considerate, with other kinds of vocal inflections, prosody, word choice, gender, accent, demographic, age, volume, speed, confidence, kindness, and style. Furthermore, the system may try different personalities to learn what is effective.

And, the chatbot may be more motivational than more simplistic approaches. The treadmill motivates a user even at the end of an exercise session, thereby inducing a positive attitude on exercise. The chatbot carp make the experience fun by considering the context and the effectiveness of the exercise. For example, the user may be engaged in a highly demanding workout and the effectiveness is very high. The chatbot can continuously motivate the user to push themselves harder to get even better results rather than the conventional techniques that simply would show a high caloric burn and high heart rate.

In one embodiment, an anti-phase waveform based on waveform attributes of a noise emitted from the treadmill may cause a sound of the anti-phase waveform to be emitted into a surrounding environment and/or other locations. This may assist the chatbot in communicating with the user.

In another embodiment, the chatbot may dynamically assess the current condition of the user prior to the exercise based on the nature and type of exercise, and the invention may further trigger a CAPTCHA-like challenge to confirm the user fitness or context for the exercise to be carried out. It is noted also that this kind of interaction can be used to shape the chatbot's demeanor, word selection, conversational style, etc. This can be facilitated by implementing automatic user profile disclosing function from one or more user computing devices (mobile phone, activity tracking devices like Fitbit®, smartwatch, etc.). In some embodiment, the chatbot may recommend the user to perform pre-exercise for a duration D time period outside of the current exercise machine.

In another embodiment, the system may recognize individual in a number of ways such as using biometric software (e.g., face recognition), voice recognition, patterns of exercise, interaction sequences, etc. It may aggregate data from online sources (e.g., recommended fitness and training steps).

The user can specify some conditions by interacting with the machine and the exercise machine can give the user the option to be notified (e.g., notify me, by email or text, when a user of similar personality is detected) when the condition is met. Through appropriate chatbot technology, the system can use a kindly-tone, expressing regret, if deemed useful or appropriate, if a user is not achieving goals.

In one embodiment, the system may recommend the user to switch to other exercises machine, chatbot technologies, and exercise methods, based on identified personality type.

Thus, the invention can provide for an exercise machine with voice input and output, a context associated with the use of the machine, a chatbot associated with the machine (e.g., for context-dependent humanlike dialog), and, based on the context, the chatbot provides an output (e.g., the treadmill chatbot communicates, with one or more personalities, with a user).

Thus, the invention provides (via the chatbot) the exercise machine a personality which is dynamic and tailored to each user. This is in complete contrast to static exercise machines which are fixed to no user.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system server 12. Examples, include, but are not limited to: microcode, circuit drivers, redundant processing units, external disk drive arrays, RAID systems, tape drives, and data archival storage systems, etc.

Figure 4:
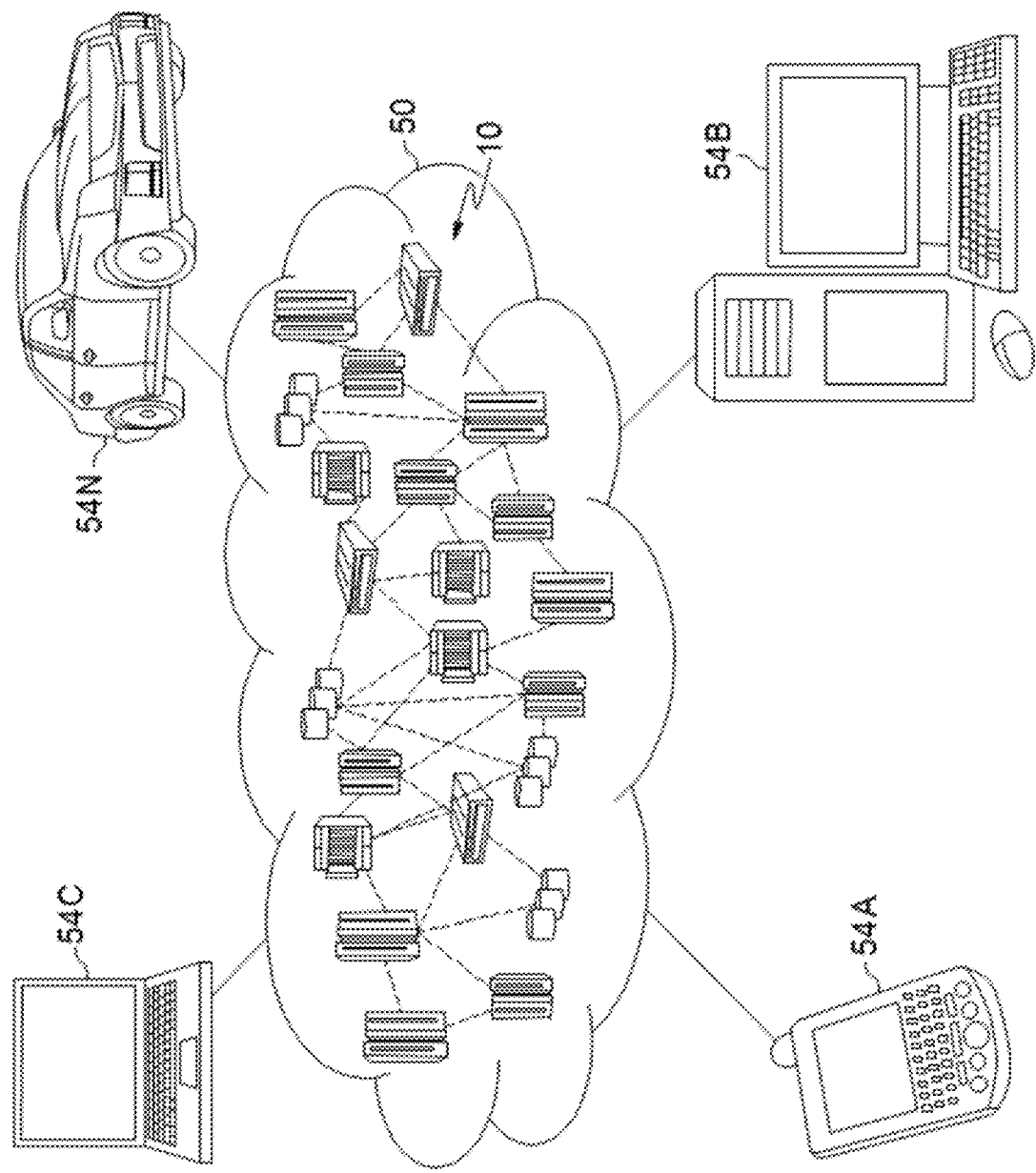
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
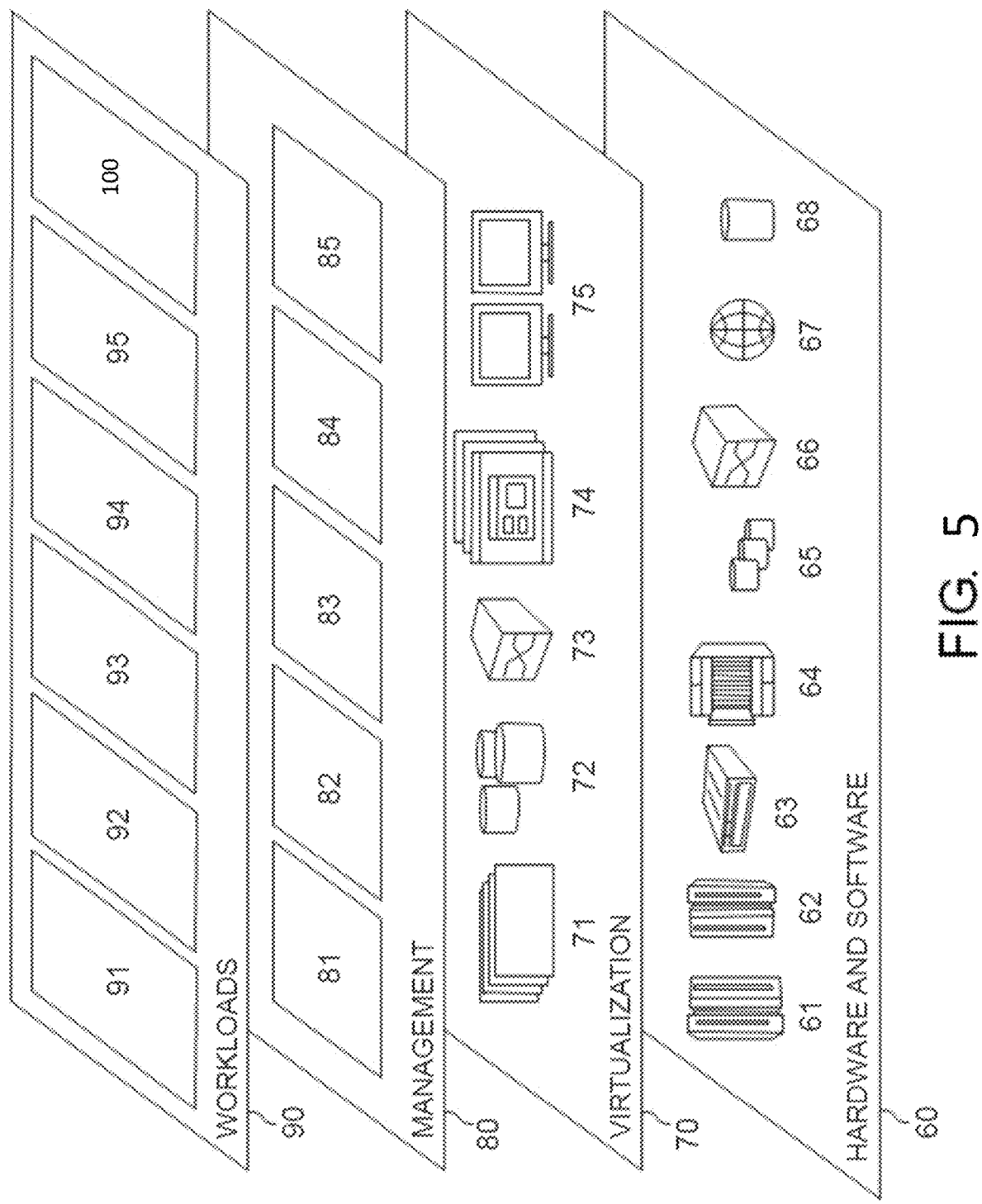
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and exercise chatbot control method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry; field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented exercise chatbot control method for controlling an exercise machine including a chatbot, the method comprising:
   determining a context of a user on the exercise machine via a sensor;
   learning an effectiveness of an activity for the user using the exercise machine;
   dynamically configuring the activity for the user on the exercise machine and a level of performance of the activity to an ideal activity level based on a user profile, the context of the user, and the effectiveness of the activity for the user; and
   providing an output including the ideal activity level from the chatbot to the user.

2. The computer-implemented method of claim 1, wherein the output of the chatbot comprises a conversation with the user in which the chatbot learns what demeanor is most effective over time, as a machine develops a personality.

3. The computer-implemented method of claim 1, wherein the context is selected from a group consisting of:
   a time of day;
   a day of week,
   a performance of a second user; and
   a location of the exercise machine.

4. The computer-implemented method of claim 1, wherein the context is determined based on one of:
   a user profile;
   a user cohort;
   a user history;
   a calendar entry of the user;
   a history of a use of the exercise machine;
   a cognitive state of the user; and
   a history of trainer feedback.

5. The computer-implemented method of claim 1, wherein the chatbot output organizes a virtual race with a second user.

6. The computer-implemented method of claim 1, wherein the output of the chatbot includes an encouraging message associated with the ideal activity level to optimize a performance of the user.

7. The computer-implemented method of claim 1, wherein the output of the chatbot includes a selection of a music playlist to motivate the user to perform at the ideal activity level.

8. The computer-implemented method of claim 1, wherein the output of the chatbot facilitates a conversation between the user and a second user that has an ideal activity level similar to the ideal activity level of the user.

9. The computer-implemented method of claim 1, embodied in a cloud-computing environment.

10. A computer program product for exercise chatbot control for controlling an exercise machine including a chatbot, the computer program product comprising a computer-readable storage medium having program instructions embodied therewith, the program instructions executable by a computer to cause the computer to perform:
    determining a context of a user on the exercise machine via a sensor;
    learning an effectiveness of an activity for the user using the exercise machine;
    dynamically configuring the activity for the user on the exercise machine and a level of performance of the activity to an ideal activity level based on a user profile, the context of the user, and the effectiveness of the activity for the user; and
    providing an output including the ideal activity level from the chatbot to the user.

11. The computer program product of claim 10, wherein the output of the chatbot comprises a conversation with the user in which the chatbot learns what demeanor is most effective over time, as a machine develops a personality.

12. The computer program product of claim 10, wherein the context is selected from a group consisting of:
    a time of day;
    a day of week,
    a performance of a second user; and
    a location of the exercise machine.

13. The computer program product of claim 10, wherein the context is determined based on one of:
    a user profile;
    a user cohort;
    a user history;
    a calendar entry of the user;
    a history of a use of the exercise machine;
    a cognitive state of the user; and
    a history of trainer feedback.

14. The computer program product of claim 10, wherein the chatbot output organizes a virtual race with a second user.

15. The computer program product of claim 10, wherein the output of the chatbot includes an encouraging message associated with the ideal activity level to optimize a performance of the user.

16. The computer program product of claim 10, wherein the output of the chatbot includes a selection of a music playlist to motivate the user to perform at the ideal activity level.

17. The computer program product of claim 10, wherein the output of the chatbot facilitates a conversation between the user and a second user that has an ideal activity level similar the ideal activity level of the user.

18. An exercise chatbot control system, the system comprising:
- an exercise machine including a chatbot;
- a processor; and
- a memory, the memory storing instructions to cause the processor to perform:
  - determining a context of a user on the exercise machine via a sensor;
  - learning an effectiveness of an activity for the user using the exercise machine;
  - dynamically configuring the activity for the user on the exercise machine and a level of performance of the activity to an ideal activity level based on a user profile, the context of the user, and the effectiveness of the activity for the user; and
  - providing an output including the ideal activity level from the chatbot to the user.

19. The system of claim 18, wherein the output of the chatbot comprises a conversation with the user in which the chatbot learns what demeanor is most effective over time, as a machine develops a personality.

20. The system of claim 18, embodied in a cloud-computing environment.

* * * * *